(12) United States Patent
Oka et al.

(10) Patent No.: US 12,619,680 B2
(45) Date of Patent: May 5, 2026

(54) LEARNING DATA GENERATION DEVICE, METHOD, AND RECORD MEDIUM FOR STORING PROGRAM

(71) Applicant: Mitsubishi Electric Corporation, Tokyo (JP)

(72) Inventors: Ryunosuke Oka, Tokyo (JP); Hiroyasu Itsui, Tokyo (JP); Hayato Uchide, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 855 days.

(21) Appl. No.: 17/967,218

(22) Filed: Oct. 17, 2022

(65) Prior Publication Data

US 2023/0045484 A1     Feb. 9, 2023

Related U.S. Application Data

(63) Continuation of application No. PCT/JP2020/018299, filed on Apr. 30, 2020.

(51) Int. Cl.
*G06F 40/242* (2020.01)
*G06F 18/21* (2023.01)
(Continued)

(52) U.S. Cl.
CPC .......... *G06F 18/214* (2023.01); *G06F 18/217* (2023.01); *G06F 18/22* (2023.01); *G06F 40/268* (2020.01)

(58) Field of Classification Search
CPC ...... G06F 18/214; G06F 18/217; G06F 18/22; G06F 40/268; G06F 40/284;
(Continued)

(56) References Cited

U.S. PATENT DOCUMENTS

| | | | |
|---|---|---|---|
| 2016/0104478 A1* | 4/2016 | Seo | G10L 15/08 |
| | | | 704/244 |
| 2017/0262754 A1* | 9/2017 | Mizuno | G06F 40/30 |

(Continued)

FOREIGN PATENT DOCUMENTS

| | | | | |
|---|---|---|---|---|
| CN | 110032742 A | * | 7/2019 | G10L 15/26 |
| EP | 2315129 A1 | * | 4/2011 | G06F 16/345 |

(Continued)

OTHER PUBLICATIONS

International Search Report for PCT/JP2020/018299 (PCT/ISA/210) mailed on Jul. 21, 2020.
(Continued)

*Primary Examiner* — Hassan Mrabi
(74) *Attorney, Agent, or Firm* — Birch, Stewart, Kolasch & Birch, LLP

(57) ABSTRACT

A learning data generation device includes processing circuitry to extract a cause expression and a result expression from an input text, and to generate a modified text by at least one of a method of interchanging the cause expression and the result expression and a method of specifying one of the cause expression and the result expression as a modification target sentence and replacing the modification target sentence with a replacement candidate sentence dissimilar to the modification target sentence.

12 Claims, 7 Drawing Sheets

(51) Int. Cl.
*G06F 18/214* (2023.01)
*G06F 18/22* (2023.01)
*G06F 40/268* (2020.01)

(58) Field of Classification Search
CPC ...... G06F 40/289; G06F 40/30; G06F 40/216;
G06F 40/56; G06N 5/022; G06N 20/00
See application file for complete search history.

(56) References Cited

U.S. PATENT DOCUMENTS

| | | | | |
|---|---|---|---|---|
| 2017/0270095 A1* | 9/2017 | Ichimura | ................. | G06F 40/30 |
| 2017/0337921 A1* | 11/2017 | Aoyama | ................. | G06F 3/167 |
| 2018/0246953 A1 | 8/2018 | Oh et al. | | |
| 2020/0372915 A1* | 11/2020 | Ishii | ........................ | G10L 15/24 |
| 2020/0401794 A1* | 12/2020 | Ishii | ........................ | G10L 13/08 |
| 2021/0042469 A1 | 2/2021 | Saito et al. | | |
| 2021/0370519 A1* | 12/2021 | Ishii | ........................ | G10L 21/06 |

FOREIGN PATENT DOCUMENTS

| | | | | | | |
|---|---|---|---|---|---|---|
| JP | 3682529 | B2 | * | 8/2005 | ........... | G06F 40/289 |
| JP | 3921523 | B2 | * | 5/2007 | ........... | G06F 40/211 |
| JP | 2008282366 | A | * | 11/2008 | | |
| JP | 2009157791 | A | * | 7/2009 | | |
| JP | 4321336 | B2 | | 8/2009 | | |
| JP | 2012-243125 | A | | 12/2012 | | |
| JP | 5729633 | B2 | * | 6/2015 | | |
| JP | 2017138655 | A | * | 8/2017 | ........... | G06F 40/58 |
| JP | 2018-106390 | A | | 7/2018 | | |
| JP | 2019-153093 | A | | 9/2019 | | |
| KR | 20110024074 | A | * | 3/2011 | ......... | G10L 15/1822 |
| KR | 20110024075 | A | * | 3/2011 | ........... | G06F 40/30 |
| KR | 20110081194 | A | * | 7/2011 | ........... | G06F 16/345 |
| KR | 101253104 | B1 | * | 4/2013 | ........... | G06F 40/30 |
| KR | 10-2018-0048624 | A | | 5/2018 | | |
| KR | 20200044177 | A | * | 4/2020 | .......... | G06F 40/268 |
| WO | WO-2009096523 | A1 | * | 8/2009 | ........... | G06F 40/30 |
| WO | WO-2011077957 | A1 | * | 6/2011 | ....... | G06F 16/90344 |
| WO | WO-2011148571 | A1 | * | 12/2011 | ............... | G06N 5/02 |
| WO | WO-2014017023 | A1 | * | 1/2014 | .......... | G06F 40/279 |
| WO | WO-2019208507 | A1 | * | 10/2019 | .......... | G06F 16/383 |

OTHER PUBLICATIONS

Le et al., "Distributed Representations of Sentences and Documents", International Conference on Machine Learning, 2014, pp. 1188-1196.
Song et al., "Unsupervised Sparse Vector Densification for Short Text Similarity", Proceedings of Conference, The 2015 Conference of the North American Chapter of the Association for Computational Linguistics: Human Language Technologies, 2015, pp. 1275-1280.
Written Opinion of the International Searching Authority for PCT/JP2020/018299 (PCT/ISA/237) mailed on Jul. 21, 2020.
Korean Office Action for Korean Application No. 10-2022-7036107, dated Aug. 29, 2023, with an English translation.
Extended European Search Report issued Mar. 28, 2023 in counterpart European Patent Application No. 20933231.1.
Korean Office Action for Korean Application No. 10-2022-7036107, dated Feb. 17, 2023, with an English translation.
Chinese Office Action and Search Report for Chinese Application No. 202080099932.X, dated Aug. 30, 2025, with English translation.

* cited by examiner

FIG. 3

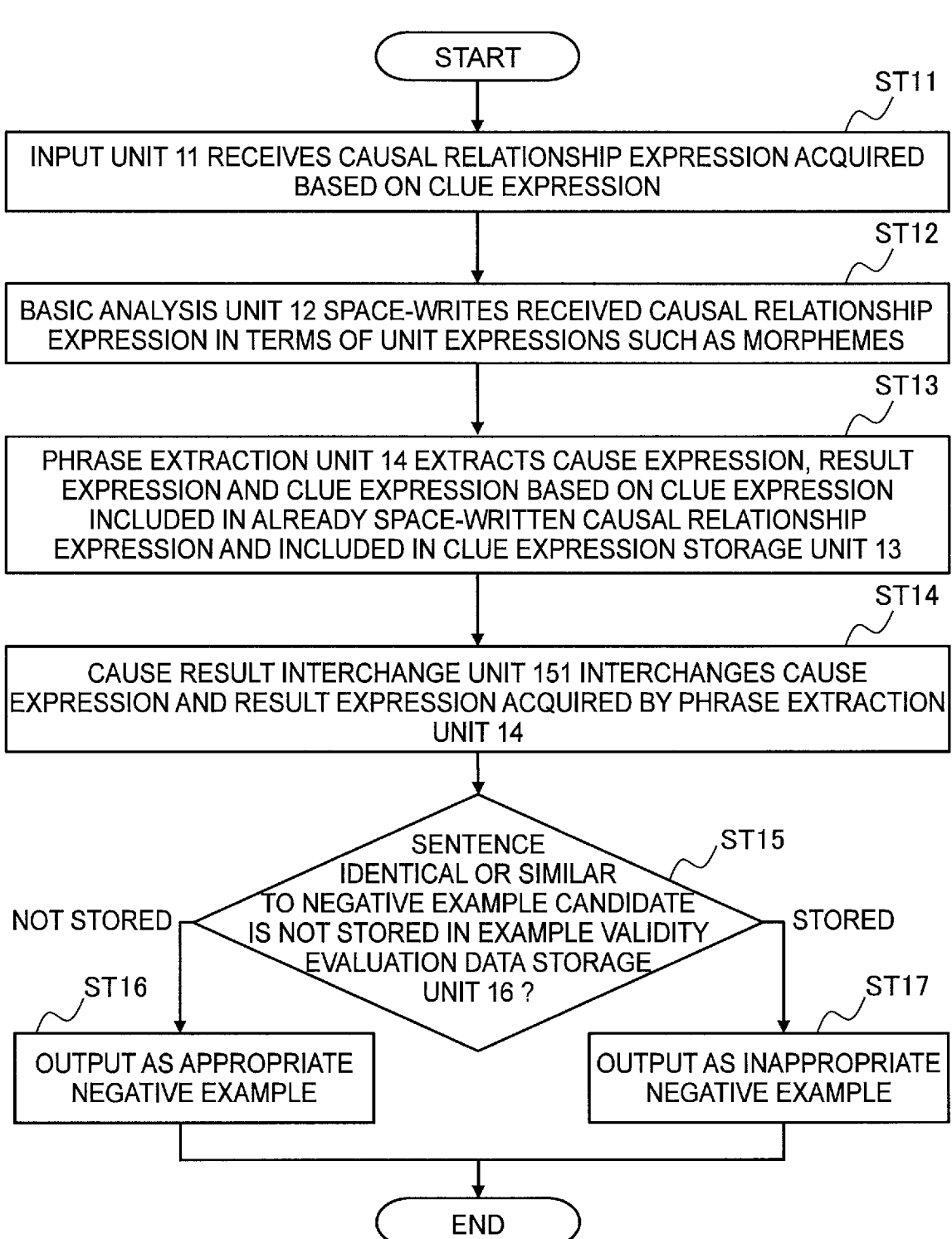

START

ST11

INPUT UNIT 11 RECEIVES CAUSAL RELATIONSHIP EXPRESSION ACQUIRED BASED ON CLUE EXPRESSION

ST12

BASIC ANALYSIS UNIT 12 SPACE-WRITES RECEIVED CAUSAL RELATIONSHIP EXPRESSION IN TERMS OF UNIT EXPRESSIONS SUCH AS MORPHEMES

ST13

PHRASE EXTRACTION UNIT 14 EXTRACTS CAUSE EXPRESSION, RESULT EXPRESSION AND CLUE EXPRESSION BASED ON CLUE EXPRESSION INCLUDED IN ALREADY SPACE-WRITTEN CAUSAL RELATIONSHIP EXPRESSION AND INCLUDED IN CLUE EXPRESSION STORAGE UNIT 13

ST14

CAUSE RESULT INTERCHANGE UNIT 151 INTERCHANGES CAUSE EXPRESSION AND RESULT EXPRESSION ACQUIRED BY PHRASE EXTRACTION UNIT 14

ST15

SENTENCE IDENTICAL OR SIMILAR TO NEGATIVE EXAMPLE CANDIDATE IS NOT STORED IN EXAMPLE VALIDITY EVALUATION DATA STORAGE UNIT 16 ?

NOT STORED                    STORED

ST16

OUTPUT AS APPROPRIATE NEGATIVE EXAMPLE

ST17

OUTPUT AS INAPPROPRIATE NEGATIVE EXAMPLE

END

FIG. 6

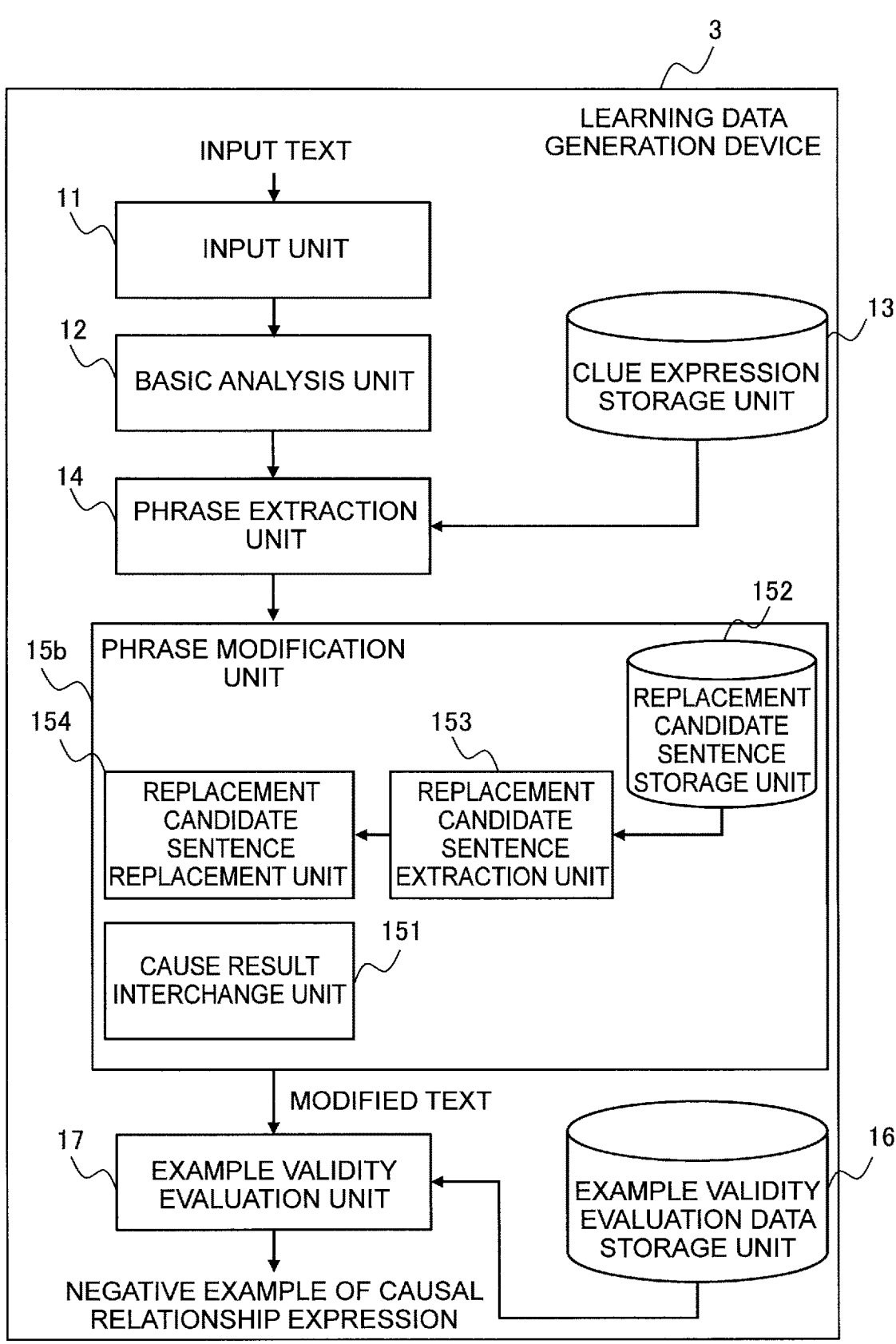

3

LEARNING DATA
GENERATION DEVICE

INPUT TEXT

11
INPUT UNIT

12
BASIC ANALYSIS UNIT

13
CLUE EXPRESSION
STORAGE UNIT

14
PHRASE EXTRACTION
UNIT

152
REPLACEMENT
CANDIDATE
SENTENCE
STORAGE UNIT

15b
PHRASE MODIFICATION
UNIT

154
REPLACEMENT
CANDIDATE
SENTENCE
REPLACEMENT UNIT

153
REPLACEMENT
CANDIDATE
SENTENCE
EXTRACTION UNIT

151
CAUSE RESULT
INTERCHANGE UNIT

MODIFIED TEXT

17
EXAMPLE VALIDITY
EVALUATION UNIT

16
EXAMPLE VALIDITY
EVALUATION DATA
STORAGE UNIT

NEGATIVE EXAMPLE OF CAUSAL
RELATIONSHIP EXPRESSION

LEARNING DATA GENERATION DEVICE, METHOD, AND RECORD MEDIUM FOR STORING PROGRAM

CROSS-REFERENCE TO RELATED APPLICATION

This application is a continuation application of International Application No. PCT/JP2020/018299 having an international filing date of Apr. 30, 2020.

BACKGROUND OF THE INVENTION

1. Field of the Invention

The present disclosure relates to a learning data generation device, a learning data generation method and a learning data generation program.

2. Description of the Related Art

There are technologies for automatically acquiring an expression that is included in a text and describes a causal relationship (referred to as a "causal relationship expression"). There are roughly two types of technologies for acquiring causal relationship expressions. A first technology is a technology using no training data, as typified by a technology of acquiring causal relationship expressions by using specific keywords or templates. For example, a technology using clue expressions such as "for" and "from" implying the existence of a causal relationship expression corresponds to the first technology. A second technology is a technology using training data, as typified by a technology of collecting sentences including a causal relationship expression and sentences including no causal relationship expression and executing text classification by use of machine learning. For example, a technology using an input text and a label indicating the position of a cause or a result in the input text and estimating a causal relationship part in the text by means of sequence labeling typified by Conditional Random Field (CRF) corresponds to the second technology. These two types of technologies are not contrary to each other, rather they are in a complementary relationship. Namely, the two types of technologies are used in ways such as acquiring a causal relationship expression estimation model by means of machine learning by using training data automatically collected by using keywords, templates or the like.

As the training data collected by using keywords, templates or the like, two types of data have to be collected. First data are positive examples. In the technology of automatically acquiring causal relationship expressions, a text including a causal relationship expression or a text provided with a label indicating that a cause or a result exists in a certain part in the text is a positive example. Second data are negative examples. In the technology of automatically acquiring causal relationship expressions, a text including no causal relationship expression or a text provided with a label indicating that neither a cause nor a result exists in a certain part in the text is a negative example.

Patent Reference 1 proposes a technology in which a causal relationship expression estimation model that has been learned by using training data automatically collected by using keywords, templates or the like is used for estimating a relationship between phrases. In the Patent Reference 1, the clue expressions implying the existence of a causal relationship expression are used for acquiring the positive examples. For example, in a case of a sentence "The ground gets wet because it rains.", a clue expression "because" is used and a cause expression ("it rains"), a result expression ("the ground gets wet") and the clue expression ("because") are acquired. On the other hand, for acquiring a negative example, among elements acquired in a positive example, an element as a cause expression or a result expression is replaced randomly. For example, in the case where the cause expression ("it rains") and the result expression ("the ground gets wet") have been acquired, the cause expression ("it rains") and a randomly replaced result expression "fall down from a ladder") are acquired as a negative example. As above, in the Patent Reference 1, both of positive examples and negative examples can be acquired automatically.

Patent Reference 1 is Japanese Patent Application Publication No. 2019-153093.

The negative example acquisition method described in the Patent Reference 1 is simple and convenient since negative examples can be collected by randomly replacing a cause element or a result element among elements acquired in positive examples. However, the negative examples acquired by this method have undergone insufficient examination regarding appropriateness of the acquired example, and thus there is a possibility that data not being a negative example or data inappropriate as Japanese language is acquired as a negative example. For example, consideration will be given here to a case where an example "crops increase" is generated as the result of randomly replacing the result expression element in the situation where the cause expression ("it rains") and the result expression ("the ground gets wet") have been acquired as a positive example. In the Patent Reference 1, "Crops increase because it rains." is acquired as a negative example. On the other hand, as viewed from human eyes, the acquired result expression is considered to have a causal relationship, and thus it may be impossible to regard the acquired negative example as an appropriate negative example. As above, the negative example acquisition method described in the Patent Reference 1 has a problem in that there is a possibility that an inappropriate example is acquired as a negative example.

SUMMARY OF THE INVENTION

An object of the present disclosure, which has been made to resolve the above-described problem, is to inhibit the generation of inappropriate negative examples.

A learning data generation device according to the present disclosure includes processing circuitry to extract a cause expression and a result expression from an input text; and to generate a modified text by at least one of a method of interchanging the cause expression and the result expression and a method of specifying one of the cause expression and the result expression as a modification target sentence and replacing the modification target sentence with a replacement candidate sentence dissimilar to the modification target sentence.

A learning data generation method according to the present disclosure is a method executed by a learning data generation device, including extracting a cause expression and a result expression from an input text; and generating a modified text by at least one of a method of interchanging the cause expression and the result expression and a method of specifying one of the cause expression and the result expression as a modification target sentence and replacing the modification target sentence with a replacement candidate sentence dissimilar to the modification target sentence.

According to the present disclosure, the generation of inappropriate negative examples can be inhibited.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a flowchart showing the operation of the learning data generation device according to the first embodiment;

FIG. 6 is a functional block diagram schematically showing the configuration of a learning data generation device according to a third embodiment.

DETAILED DESCRIPTION OF THE INVENTION

Figure 1:
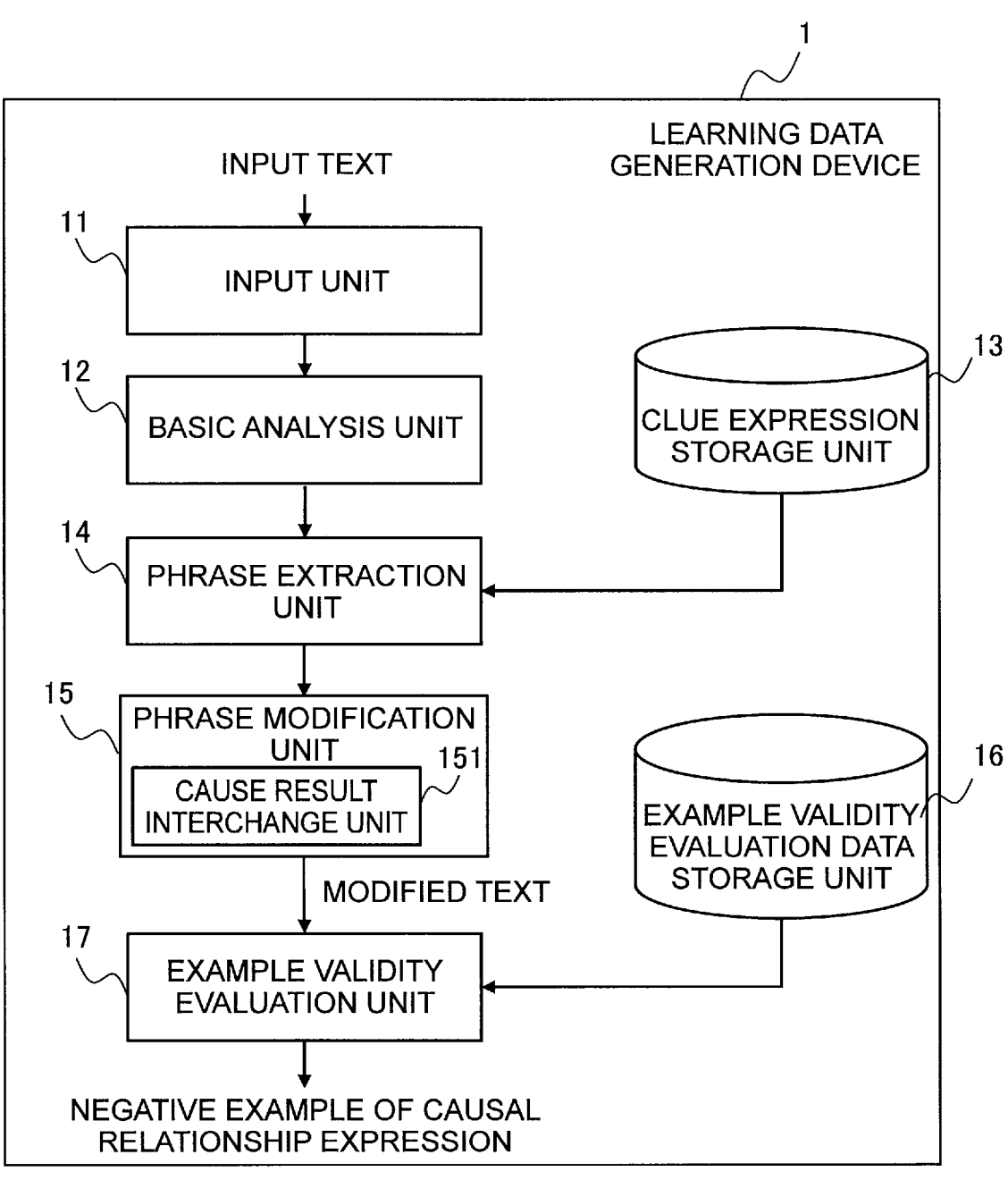
FIG. 1 is a functional block diagram schematically showing the configuration of a learning data generation device according to a first embodiment.

A learning data generation device, a learning data generation method and a learning data generation program according to each embodiment will be described below with reference to the drawings. In the drawings, components identical or similar to each other are assigned the same reference character. The following embodiments are just examples and it is possible to appropriately combine embodiments and appropriately modify each embodiment.

First Embodiment

FIG. 1 is a functional block diagram schematically showing the configuration of a learning data generation device 1 according to a first embodiment. The learning data generation device 1 is a device capable of executing a learning data generation method according to the first embodiment. The learning data generation device 1 can also be a computer as an information processing device capable of executing a learning data generation program according to the first embodiment. As shown in FIG. 1, the learning data generation device 1 includes a phrase extraction unit 14 and a phrase modification unit 15. Further, the learning data generation device 1 may include an input unit 11, a basic analysis unit 12, a clue expression storage unit 13, an example validity evaluation data storage unit 16 and an example validity evaluation unit 17.

The input unit 11 receives an input text. The input text is, for example, a text including a causal relationship expression acquired based on a clue expression. The causal relationship expression is an expression included in a text and describing a causal relationship.

The basic analysis unit 12 space-writes the causal relationship expression received by the input unit 11 in terms of unit expressions such as morphemes. The unit expression is a morpheme, a word including one or more morphemes, or the like. To "space-write" means to describe a text by placing a space as punctuation between terms. In cases where the input text is a text already space-written like an English text, the process of the basic analysis unit 12 may be left out.

The clue expression storage unit 13 is a storage device (i.e., a storage) storing a clue expression database (clue expression DB) accumulating a plurality of clue expressions. The "clue expression" means an expression that works as a clue for finding a particular part in a text, which is referred to also as a "connective expression". The stored clue expressions can be any variety of expressions as long as a relationship between phrases implies a causal relationship, such as "since", "because" and "due to". For example, the clue expressions are predetermined expressions indicating a relationship between phrases, and include conjunctives such as "and" (e.g., "~~ and then"), "supposing" (e.g., "supposing that ~~"), "in case" (e.g., "in case of ~~"), "when" (e.g., "when you did ~~"), "at the time" (e.g., "at the time of ~~"), "if" (e.g., "if you do ~~"), "since" (e.g., "since it is ~~") and "though" (e.g., "even though you did ~~"). Incidentally, the clue expression storage unit 13 can also be a storage device outside the learning data generation device 1. Further, the clue expression storage unit 13 can also be a storage device provided in a network communicatively connected to the learning data generation device 1.

The phrase extraction unit 14 extracts a cause expression and a result expression based on a clue expression that is included in the already space-written causal relationship expression generated by the basic analysis unit 12 (i.e., space-written input text) and has already been stored in the clue expression storage unit 13. Namely, the phrase extraction unit 14 extracts a cause expression, a result expression and a clue expression. For example, from the text "The ground gets wet because it rains.", based on the clue expression "because", the phrase extraction unit 14 extracts the cause expression ("it rains"), the result expression ("the ground gets wet") and the clue expression ("because").

The phrase modification unit 15 includes a cause result interchange unit 151 that generates a negative example candidate of the causal relationship expression (i.e., modified text) by interchanging the cause expression and the result expression extracted by the phrase extraction unit 14. Since the cause and the result are irreversible in many cases, it can be expected that an appropriate negative example is acquired from the modified text. For example, if the cause expression ("it rains") and the result expression ("the ground gets wet") in the text "The ground gets wet because it rains." are interchanged, a modified text "It rains because the ground gets wet." as a negative example candidate is generated. Also in cases of the English language, the negative example candidate is generated by a similar process.

The example validity evaluation data storage unit 16 is a storage device (i.e., a storage) storing an example validity evaluation database (example validity evaluation DB) accumulating a plurality of negative example candidates of causal relationship expressions. The example validity evaluation DB stores, for example, a great amount of texts existing on the Web. Namely, the example validity evaluation data storage unit 16 stores the example validity evaluation DB for the purpose of confirming that the negative example candidate of the causal relationship expression generated by the cause result interchange unit 151 does not exist as a text. Incidentally, the example validity evaluation data storage unit 16 can also be a storage device outside the learning data generation device 1. Further, the example validity evaluation data storage unit 16 can also be a storage device provided in a network communicatively connected to the learning data generation device 1.

The example validity evaluation unit 17 confirms that the negative example candidate of the causal relationship expression (i.e., modified text) generated by the cause result interchange unit 151 has not been stored in the example validity evaluation data storage unit 16 and thereby confirms that the example is an appropriate negative example. Specifically, the example validity evaluation unit 17 checks whether the negative example candidate of the causal relationship expression is appropriate as a negative example or not based on whether or not the same or similar text exists in the example validity evaluation data storage unit 16. When no text identical or similar to the negative example candidate of the causal relationship expression has been stored in the example validity evaluation data storage unit 16, the example validity evaluation unit 17 outputs the negative example candidate as an appropriate negative example. When a text identical or similar to the negative example candidate of the causal relationship expression has been stored in the example validity evaluation data storage unit 16, the example validity evaluation unit 17 outputs the negative example candidate as an inappropriate negative example.

Figure 2:
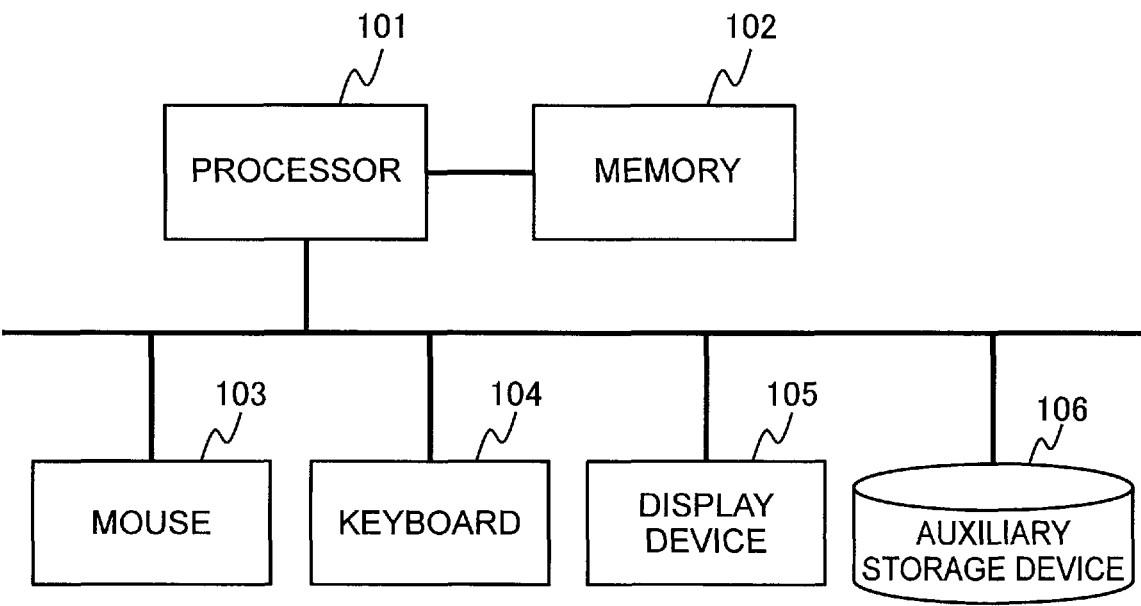
FIG. 2 is a diagram showing an example of the hardware configuration of the learning data generation device according to the first embodiment.

FIG. 2 is a diagram showing an example of the hardware configuration of the learning data generation device 1 according to the first embodiment. The learning data generation device 1 is, for example, processing circuitry including a memory 102 such as a RAM (Random Access Memory) that stores and develops a software program such as the learning data generation program and a processor 101 as an information processing unit that executes the program. The learning data generation device 1 is a computer, for example. The learning data generation device 1 includes a mouse 103 that receives inputs from a user, a keyboard 104, a display device 105 for presenting the user with an output result from the example validity evaluation unit 17 and the like, and an auxiliary storage device 106 that includes a record medium (i.e., a non-transitory computer-readable storage medium) storing a program such as the authoring program. storing a software program for implementing the functions of the learning data generation device 1 or reads and writes information from/to the record medium. The auxiliary storage device 106 is the clue expression storage unit 13 and the example validity evaluation data storage unit 16 shown in FIG. 1, for example. The auxiliary storage device 106 is a hard disk drive or an SSD (Solid State Drive), for example. Incidentally, the mouse 103, the keyboard 104, the display device 105 and the auxiliary storage device 106 can also be external devices connected to the learning data generation device 1. For example, the auxiliary storage device 106 can be a storage device existing in a cloud communicable via a communication interface. Further, an auxiliary storage device storing the software program and an auxiliary storage device storing other data may be provided as separate storage devices.

Furthermore, the whole or part of the learning data generation device 1 may also be implemented by a processing circuit such as an Application-Specific Integrated Circuit (ASIC). For example, each functional block shown in FIG. 1 may be implemented by an electric circuit.

FIG. 3 is a flowchart showing the operation of the learning data generation device 1 according to the first embodiment. The operation of each functional block shown in FIG. 1 will be described below by using the flowchart of FIG. 3.

In step ST11, the input unit 11 receives a text (i.e., input text) including a causal relationship expression acquired based on a clue expression. Here, the acquired causal relationship expression is an expression including a connective expression ("because") implying the existence of a causal relationship expression, such as "The ground gets wet because it rains.". Incidentally, the text including a causal relationship expression can be either of an arbitrary text inputted by the user by using the mouse or the keyboard, a text registered as a positive example in a database (DB) indicating causal relationships, and a text stored in the example validity evaluation data storage unit 16 which will be described later.

In step ST12, the basic analysis unit 12 space-writes the causal relationship expression in units of morphemes or the like. For example, the basic analysis unit 12 segments a sentence "The ground gets wet because it rains." (transliteration in Japanese is "amegafurunodejimenganureru.") received by the input unit 11 in units of words and thereby acquires a sentence in units of words, such as "The/ground/gets/wet/because/it/rains/." (transliteration in Japanese is "ame/ga/furu/node/jimen/ga/nureru"). Incidentally, for languages in which punctuation between words is represented by a space such as the English language, the basic analysis unit 12 may segment the sentence in units of words based on the space punctuation.

The clue expressions stored in the clue expression storage unit 13 are expressions with which the relationship between phrases implies a causal relationship, such as "since", "because" and "due to".

In step ST13, the phrase extraction unit 14 extracts a cause expression and a result expression based on the clue expression DB stored in the clue expression storage unit 13. For example, from the input text "The ground gets wet because it rains.", based on the clue expression "because", the phrase extraction unit 14 acquires the cause expression "it rains", the result expression "the ground gets wet" and the clue expression "because". In the case of the English language, from the original sentence (e.g., "The ground gets wet because it rains.") included in the input text, based on the clue expression "because", the phrase extraction unit 14 extracts the cause expression "it rains" and the result expression "the ground gets wet".

In step ST14, the cause result interchange unit 151 of the phrase modification unit 15 generates a negative example candidate of the causal relationship expression (i.e., modified text) by interchanging the cause expression and the result expression acquired by the phrase extraction unit 14. For example, a sentence "It rains because the ground gets wet." is generated from "it rains" (cause expression), "the ground gets wet" (result expression) and "because" (clue expression). Since the cause and the result are irreversible in many cases, the possibility of acquiring an appropriate negative example is high. In the case of the English language, the cause result interchange unit 151 generates the negative example candidate by a similar process.

In step ST15, the example validity evaluation unit 17 checks whether the negative example candidate of the causal relationship expression is appropriate as a negative example or not based on whether or not the same or similar sentence exists in the example validity evaluation DB of the example validity evaluation data storage unit 16. A sentence written on the Web is highly likely to be a sentence recorded by a writer as a correct sentence that makes sense. Further, there exist a great amount of sentences on the Web. In consideration of these facts, when the negative example candidate of the causal relationship expression generated by the cause result interchange unit 151 is a sentence that makes sense, there is a high possibility that the same or similar sentence exists in the example validity evaluation DB of the example validity evaluation data storage unit 16. In contrast, when the negative example candidate of the causal relationship expression generated by the cause result interchange unit 151 is not a sentence that makes sense, it can be considered that the same or similar sentence does not exist in the example validity evaluation DB of the example validity evaluation data storage unit 16. As above, by checking whether the negative example candidate of the causal relationship expression generated by the cause result interchange unit 151 exists in the example validity evaluation DB or not, there is a high possibility that it can be guaranteed that the negative example candidate is an appropriate negative example, that is, a text that does not appropriately make sense (not in a causal relationship).

Incidentally, while the example validity evaluation unit 17 checks whether the same or similar sentence exists in the example validity evaluation DB of the example validity evaluation data storage unit 16 or not, speeding up of this search is possible depending on the search method. For example, the presence/absence of a similar sentence can be checked at high speed by using a search method based on an inverted index as typified by Elasticsearch. In contrast, when using a method like that described in Non-patent Reference 1 in which the search is made by using the degree of similarity between a search sentence and a search target sentence, the check can be made while expanding the targets for the similar sentences even though the speed decreases.

Non-patent Reference 1: Song, Y. and Roth, D., "Unsupervised Sparse Vector Densification for Short Text Similarity", Proceedings of Conference, The 2015 Conference of the North American Chapter of the Association for Computational Linguistics: Human Language Technologies, 2015, pp. 1275-1280

As described above, with the learning data generation device 1 according to the first embodiment, the cause result interchange unit 151 is capable of acquiring a negative example candidate just by executing the process of interchanging the cause expression and the result expression extracted from the input text by the phrase extraction unit 14, that is, interchanging phrases.

Further, since the example validity evaluation unit 17 judges whether the negative example candidate is an appropriate negative example or not, appropriate negative examples in the learning data for analyzing the causal relationship can be generated efficiently.

Second Embodiment

Figure 4:
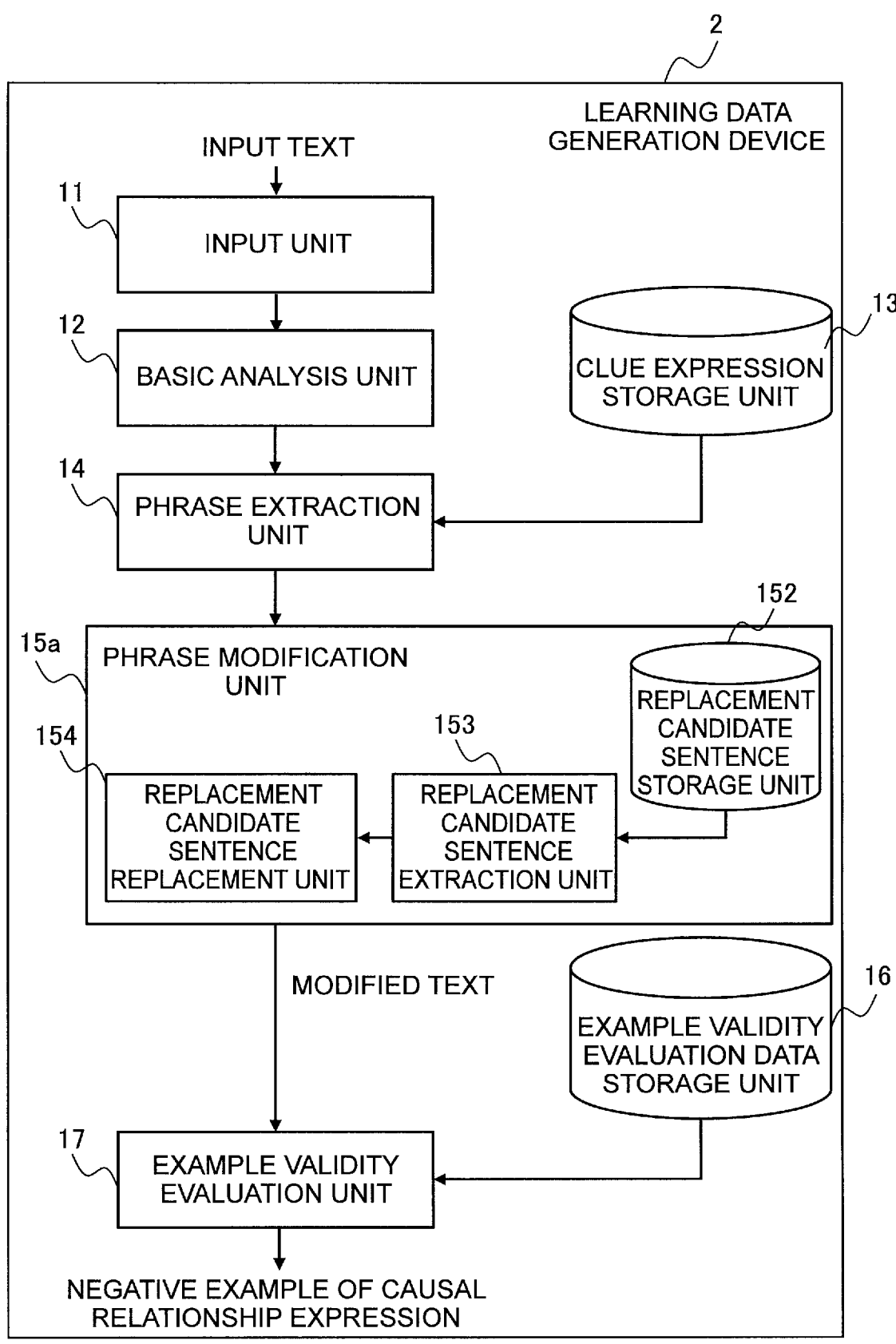
FIG. 4 is a functional block diagram schematically showing the configuration of a learning data generation device according to a second embodiment.

FIG. 4 is a functional block diagram schematically showing the configuration of a learning data generation device 2 according to a second embodiment. The learning data generation device 2 according to the second embodiment differs from the learning data generation device 1 according to the first embodiment in the configuration of a phrase modification unit 15a. The phrase modification unit 15a in the second embodiment includes a replacement candidate sentence storage unit 152 storing a replacement candidate sentence database (replacement candidate sentence DB), a replacement candidate sentence extraction unit 153, and a replacement candidate sentence replacement unit 154. The phrase modification unit 15a generates a negative example candidate as the modified text by specifying one of the cause expression and the result expression as a modification target sentence and replacing the modification target sentence with a replacement candidate sentence dissimilar to the modification target sentence.

The replacement candidate sentence storage unit 152 has stored a variety of sentences as the replacement candidate sentence database (replacement candidate sentence DB). The replacement candidate sentence extraction unit 153 specifies one of the cause expression and the result expression extracted by the phrase extraction unit 14 as the modification target sentence and extracts a replacement candidate sentence, as a sentence dissimilar to the modification target sentence, from the replacement candidate sentence DB of the replacement candidate sentence storage unit 152. The replacement candidate sentence replacement unit 154 generates the modified text by replacing modification target sentence with the replacement candidate sentence extracted by the replacement candidate sentence extraction unit 153. Incidentally, the replacement candidate sentence storage unit 152 can also be a storage device outside the learning data generation device 2. Further, the replacement candidate sentence storage unit 152 can also be a storage device (i.e., a storage) provided in a network communicatively connected to the learning data generation device 2.

Except for the above-described features, the configuration of the learning data generation device 2 is the same as the configuration of the learning data generation device 1. Further, the hardware configuration of the learning data generation device 2 in the second embodiment is the same as that shown in FIG. 2.

Figure 5:
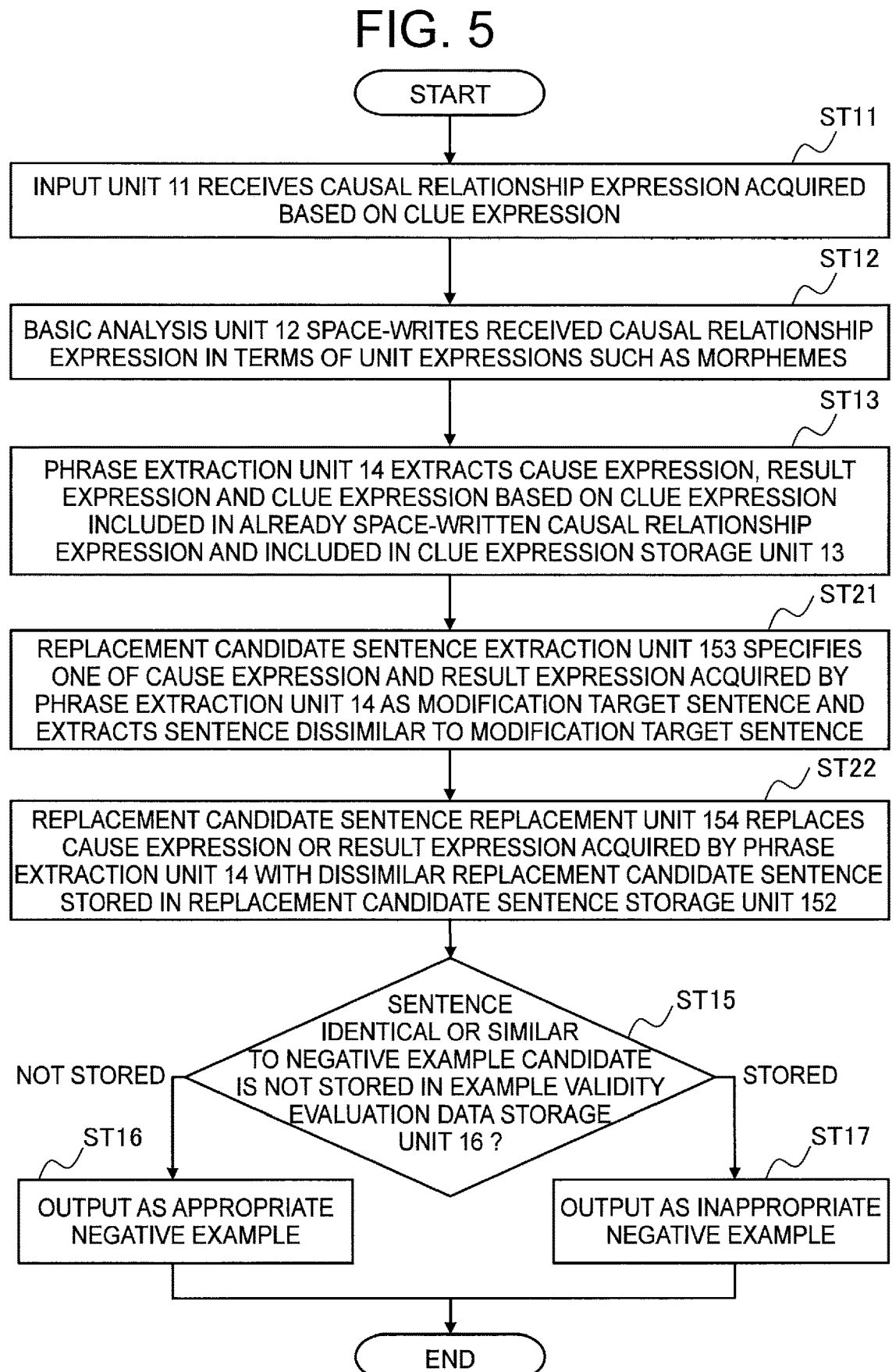
FIG. 5 is a flowchart showing the operation of the learning data generation device according to the second embodiment.

FIG. 5 is a flowchart showing the operation of the learning data generation device 2 according to the second embodiment. The process of FIG. 5 differs from the process of FIG. 3 in steps ST21 and ST22. The other steps are the same as those in FIG. 3. Thus, the steps ST21 and ST22 will be described below.

In the step ST21, the replacement candidate sentence extraction unit 153 extracts a sentence dissimilar to the result expression from the replacement candidate sentence storage unit 152. For example, it is assumed here that the cause expression "it rains", the result expression "the ground gets wet" and the clue expression "because" have been extracted by the phrase extraction unit 14. In this case, the replacement candidate sentence extraction unit 153 extracts a sentence "a ladder collapses" dissimilar to the result expression "the ground gets wet" from the replacement candidate sentence storage unit 152. Similarly, the replacement candidate sentence extraction unit 153 extracts a sentence dissimilar to the cause expression from the replacement candidate sentence storage unit 152.

In the replacement candidate sentence extraction unit 153, as the method of calculating the degree of similarity between sentences for the extraction of the sentence dissimilar to the result expression or the sentence dissimilar to the cause expression, it is possible to use a method described in Non-patent Reference 2 or an equivalent statistical method directly calculating the degree of similarity between sentences. Alternatively, as the method of calculating the degree of similarity between sentences, it is also possible to use a statistical method calculating the degree of similarity between sentences based on word similarity, equivalent to the method of the Non-patent Reference 1. The judgment on the degree of similarity between sentences (criterion for judging that the negative example candidate is an appropriate negative example) by the replacement candidate sentence extraction unit 153 is determined based on an arbitrarily set threshold value. The threshold value may be either dynamically determined according to an input or fixed at a constant number.

In the replacement candidate sentence extraction unit 153, by setting the threshold value low, an appropriate negative example dissimilar to the original cause or result can be generated. In contrast, by setting the threshold value high, a lot of examples can be acquired even though the examples can be similar to the original cause. In the replacement candidate sentence extraction unit 153, by setting the threshold value high, it also becomes possible to extract an appropriate positive example similar to the original cause.

Non-patent Reference 2: Le, Q. and Mikolov, T., "Distributed Representations of Sentences and Documents", International Conference on Machine Learning, 2014, pp. 1188-1196

In the step ST22, the replacement candidate sentence replacement unit 154 specifies one of the cause expression and the result expression acquired by the phrase extraction unit 14 as the modification target sentence and replaces the modification target sentence with the replacement candidate sentence, as a sentence dissimilar to the modification target sentence, extracted by the replacement candidate sentence extraction unit 153. For example, it is assumed here that the cause expression "it rains", the result expression "the ground gets wet" and the clue expression "because" have been extracted by the phrase extraction unit 14. Further, it is assumed here that the replacement candidate sentence "a ladder collapses" as a sentence dissimilar to the result expression has been extracted by the replacement candidate sentence extraction unit 153. The replacement candidate sentence replacement unit 154 replaces the result expression with the replacement candidate sentence "a ladder collapses" dissimilar to the extracted result expression. In the case where an element as the cause expression or the result expression is replaced with a dissimilar example, it can be expected that an example in which no causal relationship holds is more likely to be acquired compared to cases where the element is replaced with a similar example. Thus, it can be expected that an appropriate negative example can be generated. For example, "the ground gets wet" and "a ladder collapses" are judged to be dissimilar sentences, and thus the modified text is outputted from the phrase modification unit 15a as an appropriate negative example. In contrast, for example, "the ground gets wet" and "crops increase" include words similar to each other such as ground and crops, and thus the modified text is outputted from the phrase modification unit 15a as an inappropriate negative example.

As described above, with the learning data generation device 2 according to the second embodiment, the replacement candidate sentence replacement unit 154 generates a text obtained by replacing the modification target sentence as one of the cause expression and the result expression in the input text with the replacement candidate sentence as a sentence dissimilar to the modification target sentence. Accordingly, an appropriate negative example can be generated. Especially, since a text dissimilar to the cause expression or the result expression is acquired from the replacement candidate sentence storage unit 152, a lot of dissimilar texts corresponding to one cause expression or result expression can be extracted and a lot of negative examples can be generated efficiently from one input text inputted to the input unit 11.

Further, in the replacement candidate sentence extraction unit 153, by setting a threshold value in regard to the degree of similarity of a target sentence that should be extracted, it is possible to realize negative example generation flexibly meeting a request, such as generating a negative example with high reliability or generating a lot of negative examples.

Third Embodiment

FIG. 6 is a functional block diagram schematically showing the configuration of a learning data generation device 3 according to a third embodiment. The learning data generation device 3 according to the third embodiment is a device having both of the function of the learning data generation device 1 according to the first embodiment and the function of the learning data generation device 2 according to the second embodiment. The learning data generation device 3 according to the third embodiment differs from the learning data generation devices 1 and 2 according to the first and second embodiments in the configuration of a phrase modification unit 15b. The phrase modification unit 15b in the third embodiment includes the cause result interchange unit 151 included in the learning data generation device 1 and the replacement candidate sentence storage unit 152, the replacement candidate sentence extraction unit 153 and the replacement candidate sentence replacement unit 154 included in the learning data generation device 2. The phrase modification unit 15b generates the modified text by at least one of the method of interchanging the cause expression and the result expression and the method of specifying one of the cause expression and the result expression as the modification target sentence and replacing the modification target sentence with a replacement candidate sentence dissimilar to the modification target sentence.

Except for the above-described features, the configuration of the learning data generation device 3 is the same as the configuration of the learning data generation device 1 or 2. Further, the hardware configuration of the learning data generation device 3 in the third embodiment is the same as that shown in FIG. 2.

Figure 7:
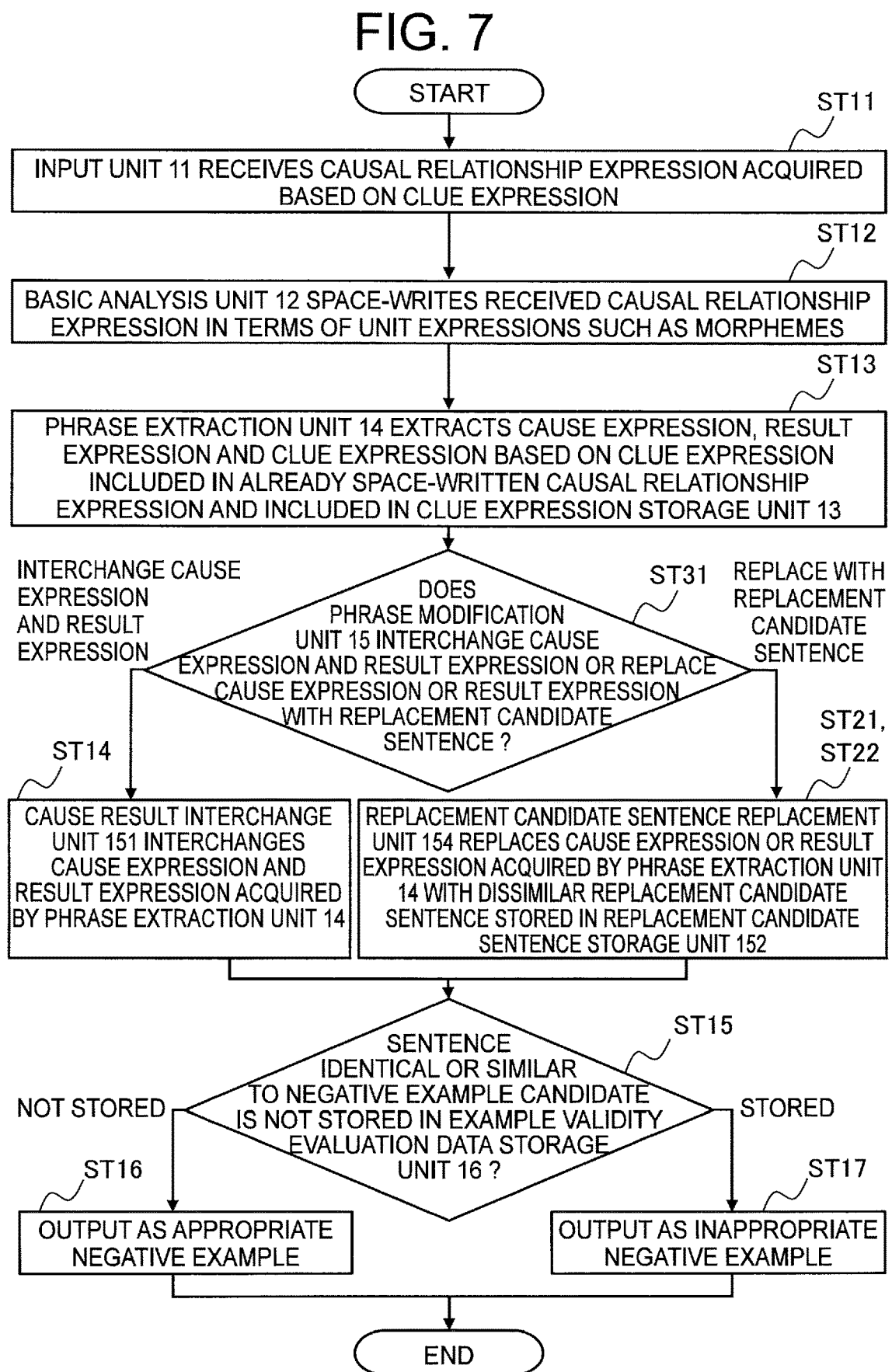
FIG. 7 is a flowchart showing the operation of the learning data generation device according to the third embodiment.

FIG. 7 is a flowchart showing the operation of the learning data generation device 3 according to the third embodiment. The process of FIG. 7 differs from the process of FIG. 3 or FIG. 5 in including step ST31. The other steps are the same as those in FIG. 3 or FIG. 5. Thus, the step ST31 will be described below.

In the step ST31, the phrase modification unit 15b selects whether to make the cause result interchange unit 151 generate the negative example candidate by the interchange of the cause expression and the result expression or to make the replacement candidate sentence replacement unit 154 generate the negative example candidate by replacing the modification target sentence as one of the cause expression and the result expression with the replacement candidate sentence. However, it is also possible for the phrase modification unit 15b to execute these two processes in sequence.

Which of the cause result interchange unit 151 and the replacement candidate sentence replacement unit 154 should be used may be either previously determined and fixed or dynamically determined depending on the type of the sentence.

As described above, in the learning data generation device 3 according to the third embodiment, the negative example generation can be switched between the generation by the cause result interchange unit 151 by interchanging the cause expression and the result expression and the generation by the replacement candidate sentence replacement unit 154 by replacing the modification target sentence as one of the cause expression and the result expression with the replacement candidate sentence as a dissimilar sentence, and thus negative examples in the learning data suitable for the purpose can be generated.

For example, in cases where a plurality of input texts are received and these input texts are relevant to a plurality of fields (e.g., fields of weather, medical treatment, diet, etc.), a negative example in regard to all the fields relevant to the input texts can be generated quickly by executing the process of interchanging the cause and the result by the cause result interchange unit 151.

In cases where it is desired to generate a great amount of negative examples related to a particular field, negative examples related to a desired field can be generated efficiently by executing the replacement with the replacement candidate sentence as a dissimilar sentence by the replacement candidate sentence replacement unit 154.

DESCRIPTION OF REFERENCE CHARACTERS

1-3: learning data generation device, 11: input unit, 12: basic analysis unit, 13: clue expression storage unit, 14: phrase extraction unit, 15, 15*a*, 15*b*: phrase modification unit, 151: cause result interchange unit, 152: replacement candidate sentence storage unit, 153: replacement candidate sentence extraction unit, 154: replacement candidate sentence replacement unit, 16: example validity evaluation data storage unit, 17: example validity evaluation unit.

What is claimed is:

1. A learning data generation device comprising:
   processing circuitry configured to, for each of a plurality of input text
   extract a cause expression and a result expression from an input text among the plurality of input text;
   generate a modified text by at least one of a method of interchanging the cause expression and the result expression and a method of specifying one of the cause expression and the result expression as a modification target sentence and replacing the modification target sentence with a replacement candidate sentence dissimilar to the modification target sentence;
   compare the modified text to an example validity evaluation database, the example validity evaluation database including examples of valid expressions, each valid expression including a valid sentence, the comparing including comparing the replacement candidate sentence with the valid sentence; and
   in response to the modified text not being identical or similar to any sentence in the example validity evaluation database, add the modified text as a negative example in a negative example data set,
   wherein the modified text is determined to be not similar to a sentence in the example validity evaluation database using a similar sentence search method.

2. The learning data generation device according to claim 1, wherein the processing circuitry extracts a clue expression from the input text and extracts the cause expression and the result expression based on the clue expression.

3. The learning data generation device according to claim 2, wherein the processing circuitry extracts the clue expression by referring to a clue expression database accumulating a plurality of clue expressions.

4. The learning data generation device according to claim 3, comprising a storage storing the clue expression database.

5. The learning data generation device according to claim 1, wherein the processing circuitry
   extracts the replacement candidate sentence dissimilar to the modification target sentence from a replacement candidate sentence database accumulating a plurality of replacement candidate sentences, and
   replaces the modification target sentence with the extracted replacement candidate sentence.

6. The learning data generation device according to claim 5, wherein the processing circuitry obtains a degree of similarity between the modification target sentence and a text in the replacement candidate sentence database and extracts the replacement candidate sentence based on a result obtained by comparing the degree of similarity with a predetermined threshold value.

7. The learning data generation device according to claim 5, comprising a storage storing the replacement candidate sentence database.

8. The learning data generation device according to claim 1, comprising a storage storing the example validity evaluation database.

9. The learning data generation device according to claim 1, wherein the processing circuitry
   segments the input text into a plurality of unit expressions, and
   extracts the cause expression and the result expression from the input text segmented into the unit expressions.

10. The learning data generation device according to claim 9, wherein the unit expression is a morpheme or a word including one or more morphemes.

11. A learning data generation method executed by a learning data generation device, comprising, for each of a plurality of input text:
   extracting a cause expression and a result expression from an input text among the plurality of input text;
   generating a modified text by at least one of a method of interchanging the cause expression and the result expression and a method of specifying one of the cause expression and the result expression as a modification target sentence and replacing the modification target sentence with a replacement candidate sentence dissimilar to the modification target sentence;
   comparing the modified text to an example validity evaluation database, the example validity evaluation database including examples of valid expressions, each valid expression including a valid sentence, the comparing including comparing the replacement candidate sentence with the valid sentence; and
   in response to the modified text not being identical or similar to any sentence in the example validity evaluation database, adding the modified text as a negative example in a negative example data set,
   wherein the modified text is determined to be not similar to a sentence in the example validity evaluation database using a similar sentence search method.

12. A non-transitory computer-readable record medium for storing a learning data generation program that causes a computer to execute processing comprising:
   for each of a plurality of input text:
   extracting a cause expression and a result expression from an input text among the plurality of input text;
   generating a modified text by at least one of a method of interchanging the cause expression and the result expression and a method of specifying one of the cause expression and the result expression as a modification target sentence and replacing the modification target sentence with a replacement candidate sentence dissimilar to the modification target sentence;
   comparing the modified text to an example validity evaluation database, the example validity evaluation database including examples of valid expressions, each valid expression including a valid sentence, the comparing including comparing the replacement candidate sentence with the valid sentence; and
   in response to the modified text not being identical or similar to any sentence in the example validity evaluation database, adding the modified text as a negative example in a negative example dataset, wherein the modified text is determined to be not similar to a sentence in the example validity evaluation database using a similar sentence search method.

* * * * *